3,574,203
2-SUBSTITUTED 5,6-DIHYDRO-4H-1,3-THIAZINES
Lloyd H. Conover, Quaker Hill, and James W. McFarland, Lyme, Conn., assignors to Chas. Pfizer & Co., Inc., New York, N.Y.
No Drawing. Filed Oct. 14, 1965, Ser. No. 496,138
Int. Cl. C07d 5/16, 27/22, 91/32, 93/06
U.S. Cl. 260—243                                               1 Claim

ABSTRACT OF THE DISCLOSURE

A series of 5,6-dihydro-2-(substituted)ethyl- and 5,6-dihydro-2-(substituted)vinyl-4H-1,3-thiazines and their non-toxic acid addition salts useful in the veterinary control of helminthiasis.

---

This invention relates to a series of novel cyclic thioimidates and their non-toxic acid addition salts which are especially useful as anthelmintic agents. More particularly, it relates to 5,6-dihydro-4H-1,3-thiazines having at the 2-position a 2-substituted ethyl or a 2-substituted vinyl group and the non-toxic acid addition salts thereof as agents for the control of helminthiasis.

Helminthiasis, the infestation of the animal body, and particularly the gastrointestinal tract, by various species of parasitic worms, is perhaps the most serious and most widespread disease in the world today. Although the economic significance of this disease has led to extensive research for new and more effective anthelmintics, the countermeasures developed to date have not been entirely satisfactory for one or more reasons; e.g., poor therapeutic index, specificity of action, high cost, low activity, limited anthelmintic spectrum.

According to the present invention it has now been found that a series of novel cyclic thioimidates having the general formula

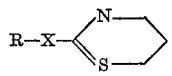

and the non-toxic addition salts thereof wherein R is selected from the group consisting of

| | |
|---|---|
| 2-furyl | 3-methyl-2-furyl |
| 5-isothiazolyl | 4-methyl-5-isothiazolyl |
| 4-thiazolyl | 5-methyl-4-thiazolyl |
| 5-thiazolyl | 4-methyl-5-thiazolyl |
| 1-methyl-5-pyrazolyl | 1,4-dimethyl-5-pyrazolyl |
| 1-methyl-2-pyrrolyl | 1,3-dimethyl-2-pyrrolyl |
| 2-thiazolyl | phenyl | and 2-substituted phenyl wherein the substituent is selected from the group consisting of chloro, bromo, iodo, fluoro, nitro, methyl and ethyl; 3-substituted phenyl wherein the substituent is selected from the group consisting of chloro, fluoro, iodo, bromo and hydroxy; 4-substituted phenyl wherein the substituent is selected from the group consisting of chloro, bromo, iodo, fluoro, hydroxy, methyl and ethyl; and X is selected from the group consisting of ethylene and vinylene (cis and trans isomers), are surprisingly effective agents in the control, e.g. therapeutic and prophylactic, of helminthiasis in animals, including man, when administered orally or parenterally, and possess favorable therapeutic ratios.

By "non-toxic" acid addition salts is meant those salts which are non-toxic at the dosages administered. The non-toxic acid addition salts of the above mentioned bases which may be employed are the water soluble and water insoluble salts such as the hydrochloride, hydrobromide, phosphate, nitrate, sulfate, acetate, hexafluorophosphate, citrate, gluconate, benzoate, propionate, butyrate, sulfosalicylate, maleate, laurate, malate, fumarate, succinate, oxalate, tartrate, amsonate (4,4'-diaminostilbene-2,2'-disulfonate), pamoate (1,1'-methylene-bis-2-hydroxy-3-naphthoate), stearate, 2-hydroxy-3-naphthoate, p-toluenesulfonate, suramin salt, methiodide, methobromide, methochloride and resin adsorbates. The hexafluorophosphate salts are especially valuable as a means for isolating the novel products of this invention from aqueous mixtures of the free bases or of water soluble acid addition salts. They precipitate out rapidly and quantitatively or almost quantitatively as crystalline products and are easily purified as by washing with water. They thus serve as a means for recovering and purifying these novel cyclic thioimidates. The free bases are, in turn, easily recovered from the hexafluorophosphate salts by neutralization. The solubility of the herein described bases in a given solvent system can, of course, be increased or decreased by judicious choice of the appropriate salt.

Resin adsorbates of the cyclic thioimidates of this invention are conveniently prepared by slurrying an aqueous solution of a water soluble salt of the cyclic thioimidate of choice with a suspension of the sodium form of a cation exchange resin for a sufficient period to permit adsorption of the compound by the resin. Suitable resins are the strong sulfonic acid type cation resins, such as Dowex 30, Amberlite CG–120, Amberlite IR–120, Zeo Karb 225 (available from the Dow Chemical Co., Rohm & Haas, and the Permutit Co., Ltd., respectively), all of which are sulfonated styrene divinyl-benzene polymers cross-linked to varying degrees.

Those compounds of this invention wherein X is vinylene (trans) are light sensitive, particularly in solution, and undergo conversion to the cis isomer. They must, therefore, be protected from light by suitable means, e.g., storage in the dark, in brown bottles, dark capsules, etc.

These agents are active against both the mature and immature forms of helminths of the families Ancylostomidae, Oxyuroidae, Ascaridoidae, Strongyloidae, and Trichlostronglyidae. They are especially effecitve against the gastrointestinal parasites of ruminants (e.g. sheep, cattle, goats) and of non-ruminants such as dogs, cats, swine and horses.

As noted above, these products are effective to a significant degree in controlling, that is, in eliminating and preventing, helminthiasis in animals, including man. The terms "controlling" and "control" as used herein are meant to include the treatment of helminthiasis in animals suffering therefrom and the prevention (prophylaxis) of helminthiasis in animals. Subcutaneous and intramuscular injections are the favored methods of parenteral injection for several reasons; simplicity, convenience and the compounds appear less toxic than when administered intravenously. According to this method of the present invention the anthelmintic agents described herein or their non-toxic acid addition salts are administered parenterally, e.g. by subcutaneous or intramuscular injection, to animals, other than man, suffering from helminthiasis of various types in a dosage equivalent to from about 5 mg. to about 150 mg. of the free base/kg. of body weight. A single injection is generally sufficient, but in the event multiple doses are employed, the injection can be repeated at regular, e.g. monthly, intervals, or more frequently if desired. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbital, etc.; buffering agents, as well as local anesthetics and inorganic salts to afford desirable pharmacological properties.

Administration of these anthelmintic agents in combination with hyaluronidase avoids local irritation, increases the rate of absorption of the drug and reduces, if not completely eliminates, the pain due to swelling and distention. Hyaluronidase levels of at least about 150 (USP) units are very effective in this respect. Higher or lower levels can, of course, be used but 150 units per dose appears to give consistently good results as evidenced by the absence of edema and the general behavior of the animal following injection of the drug preparation.

When administered by the oral route, the preferred route for administering the novel products of this invention, the compounds are given in dosages equivalent to from about 5 mg. to about 500 mg., free base/kg. of body weight. This can be achieved by a number of methods including mixing with the feed, dosage unit formulations such as capsules, tablets, liquid mixtures and solutions including drench solutions, or they can be administered in admixture with minerals such as sodium chloride which are frequently fed to animals as a supplement. Although the dosage specified is based on active ingredient, namely the base form of the cyclic thioimidate, in practical use the non-toxic acid addition salts specified and the free base can be used interchangeably; except as otherwise noted below. The non-toxic acid addition salts, especially the water insoluble acid addition salts, represent preferred forms of these novel products for the control of helminthiasis in view of their greater therapeutic index relative to that of the free bases and water soluble salts.

For therapeutic use, a dosage equivalent to from about 5 mg. to about 500 mg. of free base/kg. of body weight is recommended. Ordinarily a single dose is sufficient, but in the event multiple doses are employed, this dose is repeated on 2 or 3 consecutive days. Since the present method is effective against not only the mature worms but also against the larval stages, it is not necessary to repeat the dosage after a period of 2 to 3 weeks as is commonly done with prior anthelmintic agents. For administration to sheep, goats, cattle, horses and swine on a therapeutic basis, a drench solution or suspension which is squirted down the animal's throat by a means of a drenching syringe is convenient. For this purpose an aqueous suspension of a water insoluble nontoxic salt is preferred because of the greater therapeutic index of such salts relative to the water soluble non-toxic salts and the free bases. Suspensions having 10% of a water insoluble salt are convenient dosage forms. Of course, suspensions of lesser or greater concentration can be used if desired. Solutions having concentrations ranging from about 3% up to the limit of solubility of the salt in water are satisfactory for drench solutions. More dilute solutions of water soluble salts, e.g. 0.1% or a dispersable, wettable powder containing the desired compound, can be supplied for drinking purposes.

For prophylactic use, 5 to 50 mg. (calculated as free base) per kg. of body weight daily is administered. This is the preferred range. Higher dosages can, of course, be used but are not desirable from an economic standpoint. The above methods of administration are suitable although administration in the animal's food, water, or mineral mixture is more convenient.

For human use the oral route of administration is preferred. When used therapeutically, dosages equivalent to from about 2 mg. to about 50 mg. (calculated as free base) /kg. of body weight are recommended. For human prophylactic use from about 1 mg. to about 10 mg. (calculated as free base) /kg. of body weight daily is administered.

Boluses and capsules are also used for the therapeutic treatment of animals. For animals weighing from 30 to 1000 pounds the usual dose, calculated as free base, ranges from ½ to 45 grams. Boluses of suitable sizes containing these materials can be prepared by conventional methods.

Dry mineral mixtures containing the products of this invention are prepared containing from 0.01 to about 10% of the active ingredient mixed with salt (sodium chloride) and other minerals with which it is desired to treat the animal. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.01 to 10% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 0.01–5%, depending again upon the palatability of the material, are sometimes useful. Additionally, these compounds can be used in micronized form especially when used in emulsions or suspensions by either the oral or parenteral route of administration.

In addition to their outstanding efficacy as anthelmintic agents the compounds of this invention and their acid addition salts are also larvacidal against the aforementioned helminths. Larvae of these families, cultured from fecal material of infected sheep, when exposed to aqueous solutions of the herein described compounds of their salts soon become immobilized and die. The greater the concentration of active ingredient, the shorter the time required for immobilization and death. The compounds described herein are, therefore, valuable for preventing infection and re-infection by spraying the areas, e.g. pastures, pens, used by animals. By spraying areas used or to be used by animals prophylaxis is realized and, by administering the drugs to the animals before placing them in such areas, the development of clinical disease is prevented.

The novel products of this invention are prepared by known methods. A convenient and preferred procedure for those compounds wherein X is ethylene comprises the condensation of appropriate w-(R-substituted)propionitrile, e.g. 3-(2-furyl)propionitrile, 3-(2-thiazolyl)propionitrile, 3-(4-thiazolyl)propionitrile, 3-(1-methyl-2-pyrrolyl)propionitrile, with 3-amino-1-propanethiol.

The starting w-(R-substituted)propionitriles are produced by known methods as by dehydration of the corresponding w-(R-substituted)propionic acid amides, or by a Knoevenagel type condensation of the appropriate carboxaldehyde, R-CHO, with cyanoacetic acid in the presence of an appropriate catalyst. As catalysts for this condensation, nitrogen bases, e.g. ammonia, primary and secondary amines, pyridine, piperidine, triethanolamne, can be used. The favored catalyst system is ammonium acetate-pyridine. The reaction is conducted in a reaction-inert solvent system such as in toluene, benzene, xylene, preferably with continuous removal of by-product water. Additionally, the nitrogenous base can be used as solvent. The reaction is advantageously run at a temperature of from about 80° C. to the reflux temperature of the solvent and preferably at a temperature sufficient to permit removal of the by-product water by azeotropic distillation. The w-(R-substituted)acrylonitriles thus produced are then converted to the corresponding propionitriles by chemical or catalytic hydrogenation.

The catalytic hydrogenation is conducted with a noble metal catalyst, e.g. palladium, platinum, rhenium, rhodium, osmium, iridium. As solvent system a suitable reaction-inert solvent should be used. Methanol and other alcohols are satisfactory. The system can be neutral, basic or acidic. A neutral to slightly basic system is generally favored. The pressure and temperature appear not to be critical factors. Pressures of up to about 500 p.s.i. afford good yields. Reaction temperatures up to 100° C. can be used. The reaction should be stopped when the theoretical amount of hydrogen is taken up. Alternatively, Raney nickel is used as catalyst.

Chemical hydrogenation is readily accomplished by means of known procedures such as by sodium amalgam, zinc-hydrochloric acid and tin-hydrochloric acid. Sodium amalgam is favored in view of the better yields and smooth reaction which it affords.

In another method the imido ester hydrochlorides, prepared from the desired propionitriles by known methods, are treated with 3-mercaptopropylamine to produce the corresponding cyclic thioimidate hydrochloride. Alternatively, the imido ester, free base form is reacted with an alcoholic solution of 3-mercaptopropylamine hydrochloride or other acid addition salt. Suitable alcohols are methanol, ethanol, butanol, propanol and 2-propanol. Other solvents such as dioxane, tetrahydrofuran, ethylene glycols can also be used. An excess of the amine can be used as solvent, if desired. For large scale reactions, that is, reactions larger than laboratory scale, the use of a solvent of the type mentioned above is preferred. The reaction is carried out at a temperature of from about $-5°$ C. to 50° C. and preferably at from about $-5°$ C. to about 30° C. until formation of the product is complete or essentially complete. The cyclic thioimidate hydrochloride is recovered, e.g. removal of the solvent and recrystallization of the residue from a suitable solvent system.

Still another method for preparing these compounds involves the cyclization of the appropriate N-(w-hydroxy alkyl)[w - (R-substituted)propionamide]; N-(3-hydroxypropyl) - (3-phenyl)propionamide; N-(3-hydroxypropyl)- [3 - (2-tolyl)propionamide]; N-(3-hydroxypropyl)-[3-(4-chlorophenyl)propionamide]; N - (3 - hydroxypropyl)-[3-(2-nitrophenyl)propionamide]; in the presence of phosphorous pentasulfide. The starting N-(w-hydroxyalkyl)[w-(R-substituted)propionamides] are prepared according to known methods of amide formation, e.g. from the appropriate w-(R-substituted)propionic acid ester and 3-amino-1-propanol under conditions whereby the by-product alcohol is removed.

Those compounds of this invention wherein X is vinylene are readily and conveniently prepared by the direct condensation of the desired carboxaldehyde (RCHO) with 5,6-dihydro-2-methyl-4H-1,3-thiazine. The reaction is conducted in general at an elevated temperature, that is, at a temperature sufficiently high to remove the by-product water formed. Temperatures of from about 80° C. to about the decomposition point of the reactants and product can be used. It is advantageous to use a reaction-inert solvent, desirably one which forms an azeotrope with water, and temperatures of from about 80° C. to the reflux temperature of the solvent. The compounds thus produced have the trans configuration. The cis isomers can be obtained by irradiation of the trans isomers as described herein.

The hydrochloride salts prepared as described herein can be readily converted to the free base simply by neutralization of the acid portion of the salt by aqueous sodium or potassium hydroxide and the water insoluble free base recovered by mechanical means or by solvent extraction with a suitable immiscible solvent, can, if desired, be purified by recrystallization from a suitable solvent system or by vacuum distillation. Alternatively, the free bases are obtained by neutralization of an acid salt with sodium methoxide in methanol and recovery of the base by known methods. Other acid addition salts can be readily prepared simply by dissolving the free base in a suitable solvent, e.g. acetone, water, a lower aliphatic alcohol (ethanol, isopropanol) containing the desired acid, or to which the desired acid is subsequently added. The salts are recovered by filtration, precipitation with a nonsolvent, by evaporation of the solvent or, in the case of aqueous solutions, by lyophilization. In this manner the sulphate, nitrate, phosphate, acetate propionate, butyrate, citrate, gluconate, benzoate, pamoate, amsonate, 2-hydroxy-3-naphthoate and the sulphosalicylate and other salts can be prepared.

The following examples are provided to illustrate in greater detail the manner of practicing the present invention. They are, however, not to be considered as limiting the scope thereof in any way. (The dosages used in the following examples are calculated as the free base.)

EXAMPLE I 5,6-dihydro-2-phenethyl-4H-1,3-thiazine

In a 500 ml. three necked round bottom flask, a mixture of 75 g. (0.5 mole) of hydrocinnamic acid and 37.5 g. (0.5 mole) of 3-amino-1-propanol is stirred and slowly heated to 200° C. During the heating period water evolves from the mixture. When evolution of water ceases the mixture is allowed to cool to 150° C. The flask is then equipped with a Claisen distillation head and an adapter for the portion-wise addition of powdered phosphorus pentasulfide. At 150° C. and with vigorous stirring, phosphorus pentasulfide is added portion-wise as rapidly as caution permits. Hydrogen sulfide evolves in this phase of the reaction. After the addition is complete the pressure in the flask is reduced to 10–30 mm. to remove the residual gases. When foaming has subsided the crude product is vacuum distilled as rapidly as possible from the reaction mixture. The fraction boiling at 110–130° C. (0.2 mm.) is collected and redistilled through an efficient fractionating column to afford 5,6-dihydro-2-phenethyl-4H-1,3-thiazine: B.P. 93–95° C. at 0.08 mm.; $n_D^{24}$ 1.5775; $d_{25}^{25}$ 1.0926.

Analysis.—Calcd. for $C_{12}H_{15}NS$ (percent): C, 70.19; H, 7.36; N, 6.28. Found (percent): C, 70.28; H, 7.27; N, 6.86.

The citrate salt is prepared by treating an acetone solution of the base with an equivalent of citric acid in acetone at room temperature. An oil precipitates initially, but by warming the mixture, adding a few drops of methanol, and allowing the clear solution to cool, the crystalline salt is obtained: M.P. 96–98° C. One recrystallization from acetone methanol affords analytically pure material; M.P. 97–98° C.; $\lambda_{max}$ ($H_2O$) 249 mμ. ($\epsilon$7520).

Analysis.—Calcd. for $C_{18}H_{23}NO_7S$ (percent): C, 54.39; H, 5.83; N, 3.53. Found (percent): C, 54.42; H, 5.73; N, 3.54.

The hydrogen pamoate salt is prepared by stirring a mixture of 20.5 parts of the base, 38.8 parts of pamoic acid, and 500 parts of anhydrous ethanol for 15 hours at room temperature. The analytically pure salt is filtered and air dried; M.P. 273–283° C.

Analysis.—Calcd. for $C_{35}H_{31}NO_6S$ (percent): C, 70.80; H, 5.26; N, 2.36. Found (percent): C, 70.90; H, 5.26; N, 2.13.

The hexafluorophosphate salt is prepared by rapidly stirring one mole of the base into the mixture of 1.2 moles of hexafluorophosphoric acid (as a 65% aqueous solution) and 250 g. of ice. After the ice melts the crude crystalline product is filtered, air dried, recrystallized from isopropanol to afford the pure salt; M.P. 140–141° C.

Analysis.—Calcd. for $C_{12}H_{16}F_6NSP$ (percent): C, 41.02; H, 4.59; N, 3.99. Found (percent): C, 41.33; H, 4.52; N, 4.00.

The 3-hydroxy-2-naphthoate salt is prepared by stirring equimolar quantities of the base and 3-hydroxy-2-naphthoic acid without solvent. After a short time heat is evolved and the mixture allowed to cool to room temperature. The oily product is crystallized twice from ethyl acetate to furnish the analytically pure salt; M.P. 97–98° C.

Analysis.—Calcd. for $C_{23}H_{33}NO_3S$ (percent): C, 70.20; H, 5.89; N, 3.56. Found (percent): C, 70.25; H, 5.87; N, 3.46.

EXAMPLE II 5,6-dihydro-2-(2-tolyethyl)-4H-1,3-thiazine hydrochloride

Starting with 2-methylhydrocinnamic acid, crude 5,6-dihydro-2-(2-tolyl)-4H-1,3-thiazine is obtained in a manner analogous to that described in Example I: B.P. 140–190° C. at 0.3 mm. A solution of 17.3 g. (0.80 mole) of the crude base in 100 ml. of ether is treated with 80 ml. of 1 N anhydrous hydrogen chloride in absolute ethanol. The resulting mixture is cooled in an ice bath, and the hydrochloride salt recovered by filtration: M.P. 160–161° C. One recrystallization from acetone/methanol affords the analytically pure salt: M.P. 161–162° C.; $\lambda_{max.}$ ($H_2O$) 249 mµ (ε8200).

Analysis.—Calcd. for $C_{13}H_{18}ClNS$ (percent): C, 61.03; H, 7.09; N, 5.48. Found (percent): C, 61.23; H, 7.02; N, 5.31.

In like manner the following compounds are prepared:

5,6-dihydro-2-(2-bromophenethyl)-4H-1,3-thiazine
5,6-dihyro-2-(3-bromophenethyl)-4H-1,3-thiazine
5,6-dihydro-2-(4-bromophenethyl)-4H-1,3-thiazine
5,6-dihydro-2-(2-chlorophenethyl)-4H-1,3-thiazine
5,6-dihydro-2-(3-chlorophenethyl)-4H-1,3-thiazine
5,6-dihydro-2-(4-chlorophenethyl)-4H-1,3-thiazine
5,6-dihydro-2-(2-ethylphenethyl)-4H-1,3-thiazine
5,6-dihydro-2-(4-ethylphenethyl)-4H-1,3-thiazine
5,6-dihydro-2-(2-fluorophenethyl)-4H-1,3-thiazine
5,6-dihydro-2-(3-fluorophenethyl)-4H-1,3-thiazine
5,6-dihydro-2-(4-fluorophenethyl)-4H-1,3-thiazine
5,6-dihydro-2-(4-tolylethyl)-4H-1,3-thiazine
5,6-dihydro-2-(2-nitrophenethyl)-4H-1,3-thiazine

EXAMPLE III 5,6-dihydro-2-[2-(2-furyl)ethyl]-4H-1,3-thiazine

A solution of one mole of 3-amino-1-propanethiol hydrochloride, two moles of triethylamine, one mole of 2-furanpropionitrile and 500 ml. of ethanol is heated under reflux for six hours during which time ammonia is evolved. The solution is then cooled to room temperature, filtered and the solvent evaporated off. The residue is fractionally distilled in vacuo to give the product: B.P. 90–110° C. (0.05–0.10 mm.).

In a similar manner the following compounds are prepared:

5,6-dihydro-2-[2-(5-isothiazolyl)ethyl]-4H-1,3-thiazine
5,6-dihydro-2-[2-(1-methyl-5-pyrazolyl)ethyl]-4H-1,3-thiazine
5,6-dihydro-2-[2-(1-methyl-2-pyrrolyl)ethyl]-4H-1,3-thiazine
5,6-dihydro-2-[2-(2-thiazolyl)ethyl]-4H-1,3-thiazine
5,6-dihydro-2-[2-(4-thiazolyl)ethyl]-4H-1-,3-thiazine
5,6-dihydro-2-[2-(5-thiazolyl)ethyl]-4H-1,3-thiazine
5,6-dihydro-2-(3-hydroxyphenethyl)-4H-1,3-thiazine
5,6-dihydro-2-(4-hydroxyphenethyl)-4H-1,3-thiazine
5,6-dihydro-2-[2-(5-methyl-4-thiazolyl)ethyl]-4H-1,3-thiazine
5,6-dihydro-2-[2-(3-methyl-2-furyl)ethyl]-4H-1,3-thiazine
5,6-dihydro-2-[2-(1,3-dimethyl-2-pyrrolyl)ethyl]-4H-1,3-thiazine
5,6-dihydro-2-[2-(4-methyl-5-thiazolyl)ethyl]-4H-1,3-thiazine
5,6-dihydro-2-[2-(1,4-dimethyl-5-pyrazolyl)ethyl]-4H-1,3-thiazine
5,6-dihydro-2-[2-(4-methyl-5-isothiazolyl)ethyl]-4H-1,3-thiazine
5,6-dihydro-2-(2-iodophenethyl)-4H-1,3-thiazine
5,6-dihydro-2-(3-iodophenethyl)-4H-1,3-thiazine
5,6-dihydro-2-(4-iodophenethyl)-4H-1,3-thiazine

EXAMPLE IV

Trans 5,6-dihydro-2-styryl-4H-1,3-thiazine hexafluorophosphate

A solution of 10.6 g. (0.1 mole) of benzaldehyde, 11.5 g. (0.1 mole) of 5,6 - dihydro-2-methyl-4H-1,3-thiazine, and 40 ml. of toluene, is heated under reflux in an apparatus which includes a Dean-Stark moisture trap. After 1.3 ml. of water has been collected in the trap the reaction mixture is allowed to cool, and the more volatile components are evaporated under reduced pressure. The residue is taken up in 20 ml. of absolute ethanol, and the solution is rapidly added, with stirring, into a mixture of 25 g. of 65% hexafluorophosphoric acid and 75 g. of ice. When the ice melts the mixture is filtered to recover the water insoluble crystalline product. The salt is recrystallized twice from isopropanol to afford an analytical sample: M.P. 153–155° C.

Analysis.—Calcd. for $C_{12}H_{14}F_6NPS$ (percent): C, 41.26; H, 4.04; N, 4.01. Found (percent): C, 41.26; H, 4.12; N, 3.99.

The free base is obtained by neutralization of the acid with sodium hydroxide in water followed by extraction of the free base with ether. The base is recovered by evaporation of the ether.

EXAMPLE V

Trans 5,6-dihydro-2-(2-chlorostyryl)-4H-1,3-thiazine hydrochloride

In the manner described in Example IV, 14.1 g. of 2-chlorobenzaldehyde and 11.5 g. (0.1 mole) of 5,6-dihydro-2-methyl-4H-1,3-thiazine are condensed to afford crude 5,6 - dihydro - (2-chlorostyryl)-4H - 1,3 - thiazine The crude base is taken up in ether, and some insoluble material is filtered off. The ether is removed by evaporation; the residue treated with 200 ml. of methanol and 5.5 ml. of concentrated hydrochloric acid; then the solution is evaporated under reduced pressure. The crystalline residue is triturated under isopropanol, then filtered. The crystalline product is then recrystallized twice from absolute ethanol to furnish an analytically pure sample; M.P. 218–220° C.

Analysis.—Calcd. for $C_{12}H_{13}Cl_2NS$ (percent): C, 52.55; H, 4.78; N, 5.11. Found (percent): C, 52.92; H, 4.79; N, 5.20.

In a like manner the compounds listed below are prepared as their hydrochloride salts.

5,6-dihydro-2-[2-(5-isothiazolyl)vinyl]-4H-1,3-thiazine
5,6-dihydro-2-[2-(1-methyl-5-pyrazolyl)vinyl]-4H-1,3-thiazine
5,6-dihydro-2-[2-(2-thiazolyl)vinyl]-4H-1,3-thiazine
5,6-dihydro-2-[2-(4-thiazolyl)vinyl]4H-1,3-thiazine
5,6-dihydro-2-[2-(5-thiazolyl)vinyl]-4H-1,3-thiazine
5,6-dihydro-2-[2-(3-methyl-2-furyl)vinyl]-4H-1,3-thiazine
5,6-dihydro-2-[2-(4-methyl-5-isothiazolyl)vinyl]-4H-1,3-thiazine
5,6-dihydro-2-[2-(4-methyl-5-thiazolyl)vinyl]-4H-1,3-thiazine
5,6-dihydro-2-[2-(1,4-dimethyl-5-pyrazolyl)vinyl]-4H-1,3-thiazine
5,6-dihydro-2-[2-(1,3-dimethyl-2-pyrrolyl)vinyl]-4H-1,3-thiazine
5,6-dihydro-2-(3-hydroxystyryl)-4H-1,3-thiazine
5,6-dihydro-2-(4-hydroxystyryl)-4H-1,3-thiazine
5,6-dihydro-2-(2-iodostyryl)-4H-1,3-thiazine
5,6-dihydro-2-(3-iodostyryl)-4H-1,3-thiazine
5,6-dihydro-2-(4-iodostyryl)-4H-1,3thiazine
5,6-dihydro-2-(4-ethylstyryl)-4H-1,3-thiazine

EXAMPLE VI

Following the procedures of Examples IV, the following compounds of the formula

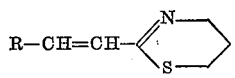

are prepared from the appropriate carboxaldehydes (R—CHO). (See Table I).

TABLE I

| R | Salt | M.P., °C. | Solvent of recrystallization | Formula | Carbon Calcd. | Carbon Found | Hydrogen Calcd. | Hydrogen Found | Nitrogen Calcd. | Nitrogen Found |
|---|---|---|---|---|---|---|---|---|---|---|
| 2-bromophenyl | HCl | 218–219 | Ethanol | $C_{12}H_{13}BrClNS$ | 45.22 | 45.25 | 4.11 | ---- | 4.40 | ---- |
| 3-bromophenyl | HCl | 194–195 | Acetonitrile | $C_{12}H_{13}BrClNS$ | 45.22 | 45.29 | 4.11 | ---- | 4.40 | ---- |
| 4-bromophenyl | HCl | 187–188 | ----do---- | $C_{12}H_{13}BrClNS$ | 45.22 | 45.41 | 4.11 | 4.18 | 4.40 | 4.13 |
| 3-chlorophenyl | HCl | 161–162 | Isopropanol | $C_{12}H_{13}Cl_2NS$ | 52.55 | 52.56 | 4.78 | 4.82 | 5.11 | 5.07 |
| 4-chlorophenyl | $HPF_6$ | 162–163 | ----do---- | $C_{12}H_{13}ClF_6NPS$ | 37.56 | 37.61 | 3.41 | 3.39 | 3.65 | 3.54 |
| 2-ethylphenyl | HCl | 208–210 | Acetonitrile | $C_{14}H_{18}ClNS$ | 62.78 | 63.19 | 6.77 | 6.89 | 5.23 | 5.03 |
| 2-fluorophenyl | $HPF_6$ | 176–178 | Ethanol | $C_{12}H_{13}F_7NPS$ | 39.24 | 39.59 | 3.59 | 3.75 | 3.82 | 3.80 |
| 3-fluorophenyl | HCl | 172–174 | Acetonitrile | $C_{12}H_{13}ClFNS$ | 55.91 | 55.70 | 5.08 | 5.13 | 5.44 | 5.34 |
| 4-fluorophenyl | HCl | 208–210 | Isopropanol/ether | $C_{12}H_{13}ClFNS$ | 55.91 | 55.80 | 5.08 | 5.08 | 5.44 | 5.18 |
| 2-furyl | $HPF_6$ | 130–131 | Isopropanol | $C_{10}H_{12}F_6NOPS$ | 35.40 | 35.15 | 3.57 | 3.68 | 4.13 | 4.00 |
| 2-methylphenyl | HCl | 216–218 | Acetone/methanol | $C_{13}H_{16}ClNS$ | 61.52 | 61.80 | 6.36 | 6.44 | 5.52 | 5.59 |
| 4-methylphenyl | HCl | 189–191 | Acetone | $C_{13}H_{16}ClNS$ | 61.52 | 61.71 | 6.36 | 6.36 | 5.52 | 5.36 |
| 1-methyl-2-pyrrolyl [1] | (²) | 69–70 | Ether | $C_{11}H_{14}N_2S$ | 64.03 | 63.96 | 6.84 | 6.74 | 13.58 | 13.37 |
| 2-nitrophenyl | $HPF_6$ | 190–192 | Methanol | $C_{12}H_{13}F_6N_2O_2PS$ | 36.55 | 36.56 | 3.32 | 3.31 | 7.11 | 7.02 |

[1] Isolated as the free base.
[2] Free base.

EXAMPLE VII

The 2-fluorohydrocinnamic acid used above is prepared as follows. A mixture of 124 g. (1.0 mole) of 2-fluorobenzaldehyde, 104 g. (1.0 mole) of malonic acid, 4 g. of ammonium acetate, 200 ml. of toluene and 110 ml. of pyridine is heated under reflux in an apparatus which includes a Dean-Stark moisture trap. Heating is continued for 48 hours after no more water collects in the trap. Solvents are evaporated under reduced pressure, and the residue is taken up in a saturated sodium bicarbonate solution. Neutral material is extracted with ether, and the aqueous solution is then cautiously acidified with hydrochloric acid. The wet, crystalline fluorocinnamic acid is filtered, dried and recrystallized. (The crude product can be used in the next step, if desired.

A pressure flask containing 106 g. (1.0 mole) of 2-fluorocinnamic acid, 800 ml. of ethanol, and 10 g. of 5% palladium-on-carbon catalyst is fitted to a Parr Hydrogenation Apparatus, flushed several times with nitrogen and then twice with hydrogen. Starting with an initial hydrogen pressure of 4 atmospheres the hydrogenation is allowed to proceed in the usual manner. When one mole of hydrogen has been absorbed the reaction is stopped, the catalyst filtered, and the filtrate evaporated under reduced pressure. The residue, crude 2 - fluorohydrocinnamic acid, may be purified by recrystallization or used directly to prepare 5,6-dihydro - 2 - (2-fluorophenethyl)-4H-1,3-thiazine.

EXAMPLE VIII

5,6-dihydro-2-methyl-4H-1,3-thiazine

Essentially, the procedure of F. M. Hammer and R. J. Rathbone (J. Chem. Soc., 243–9 (1943)) is followed. A mixture of 65 g. (1.14 moles) of acetic acid and 77 g. (1.03 moles) of 3-amino-1-propanol is heated cautiously to 200° C. to form crude N-(3-hydroxypropyl)-acetamide, and to drive off the by-product water. The crude amide (59 g., 0.5 mole) is placed in a Claisen distilling apparatus, heated to approximately 150° C. and then treated with 24 g. (0.11 mole) of phosphorus pentasulfide in small portions. When the addition is complete the volatile products are distilled from the mixture at 5–15 mm. Hg pressure. The distillate boiling up to 140° C. is collected, and then fractionally redistilled. The desired product, 5,6-dihydro-2-methyl-4H-1,3-thiazine, is collected in the fraction, boiling point 62° C./13 mm. Hg: yield 24 g. (42%); $n_D^{24}$ 1.5295.

The hydrochloride salt is prepared by dissolving 11.5 g. (0.1 mole) of the base in 100 ml. of benzene and treating the resulting solution with 37 ml. (0.11 mole) of 3 N anhydrous hydrogen chloride in anhydrous methanol. The volatiles are removed under reduced pressure, and the white solid residue recrystallized from hot acetone plus just enough methanol to effect solution: yield 8 g. (53%); M.P. 183°–185° C.

*Analysis.*—Calcd. for $C_5H_{10}ClNS$ (percent): C, 39.59; H, 6.64; N, 9.23. Found (percent): C, 39.82; H, 6.59; N, 9.14.

EXAMPLE IX

3-(2-thiazolyl)propionitrile

A solution of one mole of 3-(2-thiazolyl)propionic acid, one mole of thionyl chloride, and 500 ml. of methylene chloride is heated under gentle reflux for 5 hours. After cooling to room temperature the volatiles are evaporated under reduced pressure and the residue of crude 3-(2-thiazolyl)propionyl chloride is poured into concentrated aqueous ammonium hydroxide. The crude amide is filtered from the reaction mixture and is recrystallized.

A solution of one mole of the amide in 600 ml. of pyridine is cooled in an ice bath, and treated with one mole of benzenesulfonyl chloride at such a rate as to maintain the internal temperature below 5° C. The solution is allowed to warm to room temperature, then is poured into 4 kg. of ice and water. The aqueous mixture is acidified with concentrated hydrochloric acid, then extracted several times with ether. The combined extracts are dried, filtered and evaporated to yield an oil which is fractionally distilled through an efficient column to afford pure 3-(2-thiazolyl)propionitrile. The following compounds are prepared from the appropriate 3-substituted propionic acids.

3-(1-methyl-2-pyrrolyl)propionitrile
2-iodohydrocinnamonitrile
3-iodohydrocinnamonitrile
4-iodohydrocinnamonitrile

EXAMPLE IX

3-(5-thiazolyl)propionitrile

A mixture of one mole of 3-(5-thiazolyl)acrylonitrile, 400 ml. of ethanol and 50 g. of Raney nickel is placed under an atmosphere of hydrogen and stirred rapidly until one mole of hydrogen is absorbed. The mixture is then filtered, the filtrate evaporated to dryness and the residual oil fractionally distilled to give the desired product.

The following compounds are prepared by this procedure from the appropriate reactants:

3-(4-thiazolyl)propionitrile
3-(1-methyl-5-pyrazolyl)propionitrile
3-(1,3-dimethyl-2-pyrrolyl)propionitrile
3-(1,4-dimethyl-5-pyrazolyl)propionitrile
3-(4-methyl-5-thiazolyl)propionitrile
3-(5-methyl-4-thiazolyl)propionitrile

EXAMPLE X

3-(5-isothiazolyl)propionitrile

A solution of one mole of 3-(5-isothiazolyl)acrylonitrile, and 800 ml. of methanol under an atmosphere of carbon dioxide is stirred mechanically while 1.2 kg. of granular 5% sodium amalgam is added portion-wise over a period of 2 hours. The internal temperature is maintained below 30° C. and the mixture is stirred overnight. The alcoholic phase is filtered, and the filtrate adjusted to pH 6.5 by the addition of acetic acid. Volatiles are evaporated under reduced pressure, and the oily residue treated again with 5% sodium amalgam and worked up as described above. The crude oily product from the reduction is fractionally distilled through an efficient column to furnish pure 3-(5-isothiazolyl)propionitrile.

The following compounds are prepared by this procedure from the appropriate reactants.

3-(3-methyl-2-furyl)propionitrile
3-(4-methyl-5-isothiazolyl)propionitrile
3-hydroxyhydrocinnamonitrile

EXAMPLE XI 3-(5-thiazolyl)acrylonitrile

A mixture of one mole of 5-thiazolecarboxyaldehyde, one mole of cyanoacetic acid, 4 g. of ammonium acetate, 200 ml. of toluene, and 110 ml. of pyridine is heated under reflux in an apparatus which includes a Dean-Stark moisture trap. Heating is continued 48 hours after no more water collects in the trap. Solvents are evaporated under reduced pressure, and the residue is fractionally distilled through an efficient column. The fraction boiling at 95–110° C. (0.5–1.0 mm.), the desired product, is a mixture of the cis and trans isomers.

In a like manner the following compounds are prepared.

3-(4-thiazolyl)acrylonitrile
3-(5-isothiazolyl)acrylonitrile
3-(1-methyl-5-pyrazolyl)acrylonitrile
3-(3-methyl-2-furyl)acrylonitrile
3-(4-methyl-5-isothiazolyl)acrylonitrile
3-(4-methyl-5-thiazolyl)acrylonitrile
3-(1,4-dimethyl-5-pyrazolyl)acrylonitrile
3-(1,3-dimethyl-2-pyrrolyl)acrylonitrile
3-(5-methyl-4-thiazolyl)acrylonitrile

EXAMPLE XII

Preparation A.—1-methyl-5-pyrazolecarboxaldehyde

A mixture of 135 g. (1.0 mole) of N-methylformanilide and 153 g. (1.0 mole) of phosphorus oxychloride is placed in a 500 ml. three-necked, round bottom flask equipped with a thermometer, mechanical stirrer, dropping funnel, and a drying tube to protect the reaction mixture from moisture. After standing 30 minutes, stirring is begun, and 90 g. (1.1 mole) of 1-methyl-pyrazole is added at such a rate that the internal temperature is maintained between 25–35° C. After the addition is complete the reaction mixture is stirred two hours, then allowed to stand at room temperature overnight. The dark viscous solution is poured into a vigorously stirred mixture of 400 g. of cracked ice and 250 ml. of water. The aqueous layer is separated and is extracted several times with ether. The combined extracts are washed twice with dilute hydrochloric acid, twice with sodium bicarbonate solution, once with water, and then dried over anhydrous sodium sulfate. The residue obtained after filtering and evaporating the ether solution is fractionaly distilled through an efficient column to afford pure 1-methyl-5-pyrazolecarboxaldehyde.

Using similar procedure, 1,3-dimethylpyrrole-2-carboxaldehyde is prepared. The product is separated from the isomeric 1,4-dimethylpyrrole-2-carboxaldehyde by means of an efficient fractionating column or by preparative gas chromatography.

Preparation B.—5-methyl-4-thiazolecarboxaldehyde

A solution of 0.5 mole of ethyl 3-bromo-2-oxobutyrate in 250 ml. of diethyl ether is heated under reflux. A solution of 0.7 mole of thioformamide in 350 ml. diethyl ether is added dropwise over a 15-minute period, and heating is continued for 30 minutes after the addition is complete. The ether is evaporated and the residue is poured into 500 ml. of water. The aqueous mixture is extracted with ether and the extract is washed with saturated sodium bicarbonate solution until the final wash is neutral. The extract is then dried, filtered and evaporated to furnish a dark oil which is fractionally distilled through an efficient column to give pure ethyl 5-methyl-4-thiazole carboxylate.

A solution of one mole of ethyl 5-methyl-4-thiazole carboxylate in toluene is cooled to −70° C. in a Dry-Ice/acetone bath. With efficient stirring, one mole of diisobutylaluminum hydride is added at a rate such that the internal temperature does not rise above −55° C. Stirring and cooling are continued for one hour, and the reaction mixture is allowed to warm to 5° C. Ten moles (180 g.) of water is added cautiously to the mixture, and the resulting precipitate of hydrated aluminum oxides removed by filtration. The filtrate is evaporated under reduced pressure and the residue is fractionally distilled through an efficient column to furnish 5-methyl-4-thiazole carboxaldehyde.

EXAMPLE XIII

Cis-5,6-dihydro-2-styryl-4H-1,3-thiazine hexafluorophosphate

A stirred solution of trans-5,6-dihydro-styryl-4H-1,3-thiazine (3.0 g.) in 300 ml. of benzene is irradiated under an atmosphere of nitrogen by a 550 watt Hanovia high pressure quartz lamp for 15 hours. The benzene is evaporated under reduced pressure and the residue extracted with 30 ml. of hexane. The hexane insoluble portion is the unconverted trans isomer. The hexane extract is evaporated to afford a residue which is taken up in 25 ml. of 2 N hydrochloric acid; insoluble matter was filtered. The aqueous acid solution is filtered then treated with 3 ml. of 65% hexafluorophosphoric acid to give the cis isomer as its crystalline hexafluorophosphoric acid salt. The cis isomer is characterized by its nuclear magnetic resonance spectrum taken in dimethylsulfoxide-$d_6$: the cis isomer shows a doublet in the olefinic hydrogen region with a coupling constant of about 12 c.p.s.; the trans isomer has a doublet with a coupling constant of about 16 c.p.s.

The products of Examples V and VI are converted to their respective cis isomers by this procedure.

EXAMPLE XIV 5,6-dihydro-2(2-phenethyl)-4H-1,3-thiazinylium iodide

A solution of 5,6-dihydro-2-(2-phenethyl)4H-1,3-thiazine (0.05 mole), 50 ml. of methanol and 3.5 ml. (8.0 g., 0.056 mole) of iodomethane is allowed to stand at room temperature for six days. The solvent is then removed to give the product. For purification the product is crystallized from isopropanol:methanol (10:1).

Substitution of bromomethane and chloromethane for iodomethane in the above procedure produces the corresponding methobromide and methochloride salts.

EXAMPLE XV

The free base forms of the products of Examples I–IV are converted to acid addition salts by treatment with an equimolar proportion of the appropriate acid in methanol as solvent. The salts are recovered by filtration, by precipitation with a non-solvent, e.g., ether, hexane, or, alternatively, if desired, by evaporation of the solvent. The following acid addition salts are thus prepared: p-toluenesulfonate, hexafluorophosphate, amsonate, 2-hydroxy-3-naphthoate, stearate, citrate, gluconate, benzoate, acetate, propionate, butyrate, sulfate, nitrate, phosphate, hydrobromide, t-butylacetate, trimethylacetate, oxalate, succinate, malate and tartrate.

Application of the procedure of Example XIV to the base forms of the Examples II–VI products affords the methiodide, methobromide and methochloride salts.

EXAMPLE XVI

The hydrochloride salt of 5,6-dihydro-2-(2-phenethyl)-4H-1,3-thiazine (5.0 g.) is dissolved in water (30 ml.) and the solution added to a well-stirred suspension of Amberlite CG–120 (sodium form of a cation exchange resin) (5.9 g.) in 100 ml. water. The mixture is stirred for 3 hours, filtered, washed with water and dried in vacuo.

Resin adsorbates of the products of Examples I–VI are prepared in like manner.

EXAMPLE XVII

Tablets and boluses

A convenient tablet size is one containing 250 mg., calculated as the free base, of the drug. Such tablets can be prepared by thoroughly blending 250 g., calculated as the free base, of 2-(2-phenethyl)thiazine hydrochloride or the equivalent weight of other compounds within the scope of this invention and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from ½ to 45 g. per day depending again upon the body weight of the animals. Boluses of various sizes can be prepared in the same fashion by simply selecting a die of appropriate size.

EXAMPLE XVIII

Capsules

The products of this invention and their acid addition salts can be conveniently encapsulated in hard gelatin capsules. For therapeutic and prophylactic purposes, from about 250 mg. to 1 gram of these agents (calculated as the free base) can be contained in a single capsule. It is convenient to mix the active ingredient with a solid diluent, for instance, calcium phosphate. From about 15 to 50% the weight of drug of tricalcium phosphate is employed. Thus, a hard gelatin capsule can be prepared by thoroughly blending two parts by weight of 5,6-dihydro-2-(2-methylstyryl)-4H-1,3-thiazine pamoate and calcium phosphate in a twin shell blender. The powder is then subdivided, and loaded into hard gelatin capsules in such a fashion that each capsule contains the equivalent of 250 mg. active ingredient as the free base.

EXAMPLE XIX

Mineral mixture

Such a mixture can be conveniently made by mixing 5,6-dihydro-2-[2-(2-thiazolyl)ethyl] - 4H - 1,3 - thiazine fumarate, equivalent to 1 part by weight of free base, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animals.

In like manner mineral mixtures of the other products within the ambit of this invention can be prepared.

EXAMPLE XX

Feed mixture

Prophylactic use of these products can be properly accomplished by adding the agent to a feed mixture. The usual prophylactic dose is from about 2.5 to 25 g. (calculated as free base) daily for 1000-pound cattle. Assuming such animal consumes 10 lbs. of feed supplement per day, at least 10 lbs. of the chosen agent per ton would be incorporated. Depending upon the feed consumption of the animal and the dosage employed, the proportion of agent in the feed varies from 0.005% up to about 0.10% on a weight basis.

EXAMPLE XXI

Lambs naturally infected with gastrointestinal helminths can be cleared to a significant degree by the subcutaneous administration of 5,6-dihydro-2-[2-(1-methyl-2-pyrrolyl)ethyl]-4H-1,3-thiazine hydrochloride at levels of from about 20 mg./kg. to about 150 mg./kg. The local edema which frequently accompanies the injection can be prevented or at least minimized by the simultaneous administration of about 150 units (U.S.P.) of hyaluronidase.

Similarly, the other products of this invention can be used for the control of helminthic infection.

EXAMPLE XXII

The larvacidal activity of 5,6-dihydro-2-(2-phenethyl)-4H-1,3-thiazine hydrochloride against larvae of Haemonchus, Trichostrongylus and Strongyloides cultured from the fecal material of sheep is determined as follows.

Fecal material is cultured at 23° C., the filariform larvae removed, placed in a saline solution and counted by the dilution method. Approximately 1000 larvae are then placed on watch glasses to which various concentrations of anthelmintic agent are added (0.1%–20%). The final volume of solution is 10 ml. in each case. The mixing of larvae and anthelmintic agent is done under a dissecting microscope and the immobilization time and actual death time noted.

The filariform larvae have a rather fast undulating motion. Upon addition of the anthelmintic-containing solution the larvae lose their progressive undulating motion but continue to exhibit slow local undulations. The thus immobilized larvae soon die. The higher concentrations, as expected, are exceptionally rapid in their larvacidal action. The remaining products of this invention exhibit similar larvacidal action.

EXAMPLE XXIII

A pen previously occupied for two weeks by two sheep naturally infested with digestive Strongyles is sprayed with a 20% aqueous solution of 5,6-dihydro-2-[2-tolyl) ethyl]-4H-1,3-thiazine hydrochloride at the rate of 0.5 gallon per 1000 square feet after removal of the infected sheep. The following day two nematode-free sheep are placed in the enclosure. Daily checks of their feces for two weeks followed by post-mortem examination show no nematode infestation.

EXAMPLE XXIV

The effect of 5,6-dihydro-2-(2-phenethyl)-4H-1,3-thiazine pamoate against the migratory phases of *Ascaris suum* is determined as follows.

Fifteen pigs about five weeks old are divided into three groups of five.

Group 1—Non-infected, non-medicated;
Group 2—Laboratory infected with *Ascaris suum*, non-medicated; the above drug beginning 2 days before infection and continuing for 5 days after infection. The drug is administered orally at 50 mg./kg. body weight.

The test animals are infected with $4 \times 10^5$ embryonated *Ascaris suum* ova using a stomach tube. All animals are sacrificed 8 days after the infection and the livers and lungs inspected for characteristic lesions and the number of larvae present.

The drug is thus found to be highly effective in protecting pigs against *Ascaris suum* infection. The infected, but non-medicated, animals developed thumping and their livers and lungs are covered with innumerable mottling lesions and petechial hemorrhages. The infected but medicated animals show no abnormal clinical signs during the experiment. Their livers show some mottling lesions. However, similar lesions appeared in the non-infected, non-medicated animals indicating they contained some natural *Ascaris suum* infection.

Similar protection is provided by the remaining compounds of this invention.

What is claimed is:
1. 5,6-dihydro-2-[2-(2-thiazolyl)ethyl]-4H-1,3-thiazine.

References Cited

UNITED STATES PATENTS

| | | | |
|---|---|---|---|
| 2,579,478 | 12/1951 | Djerassi et al. | 260—243 |
| 3,390,148 | 6/1968 | Austin et al. | 260—240 |

OTHER REFERENCES

Hammer et al.: J. of the Chem. Soc. 1943, pp. 243–249.

German printed application (Auslegeschrift) 1,159,450, 3 pages specification, published Dec. 19, 1963.

Burger, Medicinal Chemistry, 2nd ed. pp. 75, 79–81 and 331–332, Interscience Publishers, New York (1960).

JOHN D. RANDOLPH, Primary Examiner

U.S. Cl. X.R.

260—302, 310, 326.62, 346.1, 453, 465, 561, 562; 424—246

PO-1050
(5/69)

UNITED STATES PATENT OFFICE
CERTIFICATE OF CORRECTION

Patent No. __3,574,203__    Dated __April 6, 1971__

Inventor(s) __Lloyd H. Conover and James W. McFarland__

It is certified that error appears in the above-identified patent and that said Letters Patent are hereby corrected as shown below:

Col. 3, line 2, "sorbital" should read -- sorbitol --.

Col. 4, line 63, "triethanolamne" should read -- triethanolami

Col. 6, line 41, "6.28" should read -- 6.82 --.

Col. 8, line 48, "5.20" should read -- 5.30 --.

Signed and sealed this 3rd day of August 1971.

(SEAL)
Attest:

EDWARD M. FLETCHER, JR.
Attesting Officer

WILLIAM E. SCHUYLER, JR.
Commissioner of Patents